United States Patent [19]

Harriman, Jr.

[11] Patent Number: 4,943,941

[45] Date of Patent: Jul. 24, 1990

[54] FLOATING POINT PROCESSOR EMPLOYING COUNTER CONTROLLED SHIFTING

[75] Inventor: Edward S. Harriman, Jr., Billerica, Mass.

[73] Assignee: Bolt Beranek and Newman Inc., Cambridge, Mass.

[21] Appl. No.: 296,617

[22] Filed: Jan. 13, 1989

[51] Int. Cl.⁵ ............................................. G06F 7/38
[52] U.S. Cl. .................................................... 364/748
[58] Field of Search ....................................... 364/748

[56] References Cited

U.S. PATENT DOCUMENTS

| | | | |
|---|---|---|---|
| 4,075,704 | 2/1978 | O'Leary | 364/748 |
| 4,366,548 | 12/1982 | Kregness et al. | 364/748 |
| 4,592,006 | 5/1986 | Hagiwara et al. | 364/748 |
| 4,598,400 | 7/1986 | Hillis | 370/60 |
| 4,644,490 | 2/1987 | Kobayashi et al. | 364/748 |
| 4,879,676 | 11/1989 | Hansen | 364/748 |

OTHER PUBLICATIONS

Bolt Beranek and Newman Inc.-Report No. 3501, "A New Multiprocessor Architecture"-Michael F. Kraley et al.-Dec. 1978.
Bolt Beranek and Newman Inc.-Report No. 4098, Chapter III: The Butterfly Switch (no publication date).
Massachusetts Institute of Technology-VLSI Publications VLSI Memo No. 86-344-Oct. 1986, "A High-Performance VLSI Quaternary Serial Multiplier"-William J. Dally.
IEEE Transactions on Computers, vol. c-34, No. 8, Aug. 1985-A Fast Serial-Parallel Binary Multiplier-R. Gnanasekaran.

Primary Examiner—Gary V. Harkcom
Assistant Examiner—Tan V. Mai
Attorney, Agent, or Firm—Henry D. Pahl, Jr.

[57] ABSTRACT

The floating point processor performs floating point addition or subtraction on a pair of binary arguments, each of which includes an exponent and a mantissa, without requiring a barrel shifter. The processor utilizes a serial arithmetic scheme in which corresponding portions of the arguments are examined sequentially as they are presented thereby to determine which argument is the larger. The exponent of the larger is loaded into a counter. The counter is decremented stepwise and each of the mantissas is shifted, most significant bits first, into an arithmetic circuit which generates carry save form results, starting when the value held by the counter corresponds to the respective exponent. The carry save form results are subsequently normalized and converted to canonical form by propagating the carries.

6 Claims, 3 Drawing Sheets

FLOATING POINT PROCESSOR EMPLOYING COUNTER CONTROLLED SHIFTING

BACKGROUND OF THE INVENTION

The present invention relates to a floating point processor and more particularly to a floating point processor which will perform floating point addition or subtraction on a pair of binary arguments utilizing serial arithmetic.

In pursuing ever greater computational power, increasing interest is being directed toward multiprocessor systems in which the total power of computation is increased by increasing the number of processors working on a given problem rather than merely increasing the size and speed of the processors themselves. As is understood, further increases in the speed and power of existing processor designs are very difficult to achieve and the costs are disproportionate to the improvements obtained. Further, speeds have currently reached a point where the length of even relatively short wires introduces delays which are difficult to compensate for. Similarly, while some multiprocessor systems proposed heretofore have utilized a bus structure for linking or coupling multiple processors and memory, the bandwidth or throughput of the bus has quickly become a factor limiting how far such designs may be expanded. Accordingly, attention has increasingly been shifting to multiprocessor architectures in which a multiplicity of processors communicate with a shared memory through a switching network which allows each processor to communicate with any portion of the memory. Known examples of this general type of multiprocessor architecture include the Butterfly computer manufactured and sold by Bolt Beranek and Newman Inc. of Cambridge, Massachusetts and the Connection Machine manufactured and sold by Thinking Machines, Inc. of Cambridqe, Mass. The architectures of the Butterfly computer and its switching network are described in BBN Report Nos. 3501 and 4098 (Chapter III) to the Defense Advanced Research Projects Agency (DARPA). The Connection Machine architecture is described in U. S. Pat. No. 4,598,400 issued July 1, 1986 to W. Daniel Hillis.

An improvement on the original Butterfly switching network is disclosed and claimed in copending, coassigned application Ser. No. 277,993 entitled "Memory Accessing Switch Network" and filed by Philip Carvey, William Crowther and Randall Rettberg. The disclosure of that application is incorporated herein by reference.

The switching network disclosed in application Ser. No. 277,993 establishes a system architecture in which a multiplicity of processors are synchronized to issue memory request messages at essentially the same predetermined time within a frame interval which encompasses a large number of basic clock periods. The messages are issued in a bit serial format in which the first part of the message comprises the memory address. In the switching network, the messages traverse a succession of layers of routing switch elements each of which makes routing decisions based on respective bits of the address so that each message is directed to the right memory module or address. The network architecture also includes concentrator elements which keep the number of leads required between layers within reasonable bounds. Further, the switch and concentrator elements include mechanisms for reducing contention between messages and for combining memory read operations so as to ameliorate the consequences of multiple processor attempting to read the same memory location.

While conventional microprocessors, i.e. processors utilizing parallel arithmetic, might be utilized for the multiple processors contemplated in application Ser. No. 277,993, e.g. by providing them with hardware or program code to format the desired bit serial messages, the full power of such processors would typically not be utilizable since the bit serial message format would typically introduce such a long delay in filling memory reuests that the processors would be held up by lack of data to process. Further, the costs, dictated mainly by the silicon chip area and power requirements of a multiplicity of such conventional parallel processors, would be onerous in attempting to construct systems employing a very large number of processors. Accordingly, it has been proposed to utilize processors which employ serial arithmetic. As in understood by those skilled in the art, serial arithmetic processors can be devised which utilize many fewer gate elements, i.e. less silicon area.

While serial arithmetic is not per se new, the present invention relates to novel apparatus for performing floating point addition and subtraction in a manner which is quite contrary to conventional wisdom and which results in a considerable saving in silicon area, in power consumption and in processing time.

SUMMARY OF THE INVENTION

The apparatus of the present invention performs floating point addition or subtraction on a pair of binary arguments which are presented serially, each of the arguments including an exponent and a mantissa. Corresponding portions of the arguments are examined sequentially as the arguments are presented thereby to determine which argument is the larger. A value corresponding to the exponent of the larger argument is loaded into a counter. Arithmetic circuit means are provided for generating carry save form result portions from corresponding portions of a pair of arguments presented thereto. Each of the exponents is compared with the current value held by the counter and control means are provided which stepwise decrement the counter and which control transferrring means responsive to the comparisons so as to initiate shifting of each mantissa into the arithmetic circuit means when the value held by the counter corresponds to the respective exponent. Through the use of the decrementing counter and by examining the arguments as they are presented, the use of a barrel shifter as is conventionally required in implementing floating point additions and subtractions is avoided. As is understood by those skilled in the art, the inclusion of a barrel shifter requires substantial silicon chip area, requires substantial power to operate, and requires substantial time to operate within the overall instruction cycle. Typically the barrel shifter is used twice in doing floating point add or subtract.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
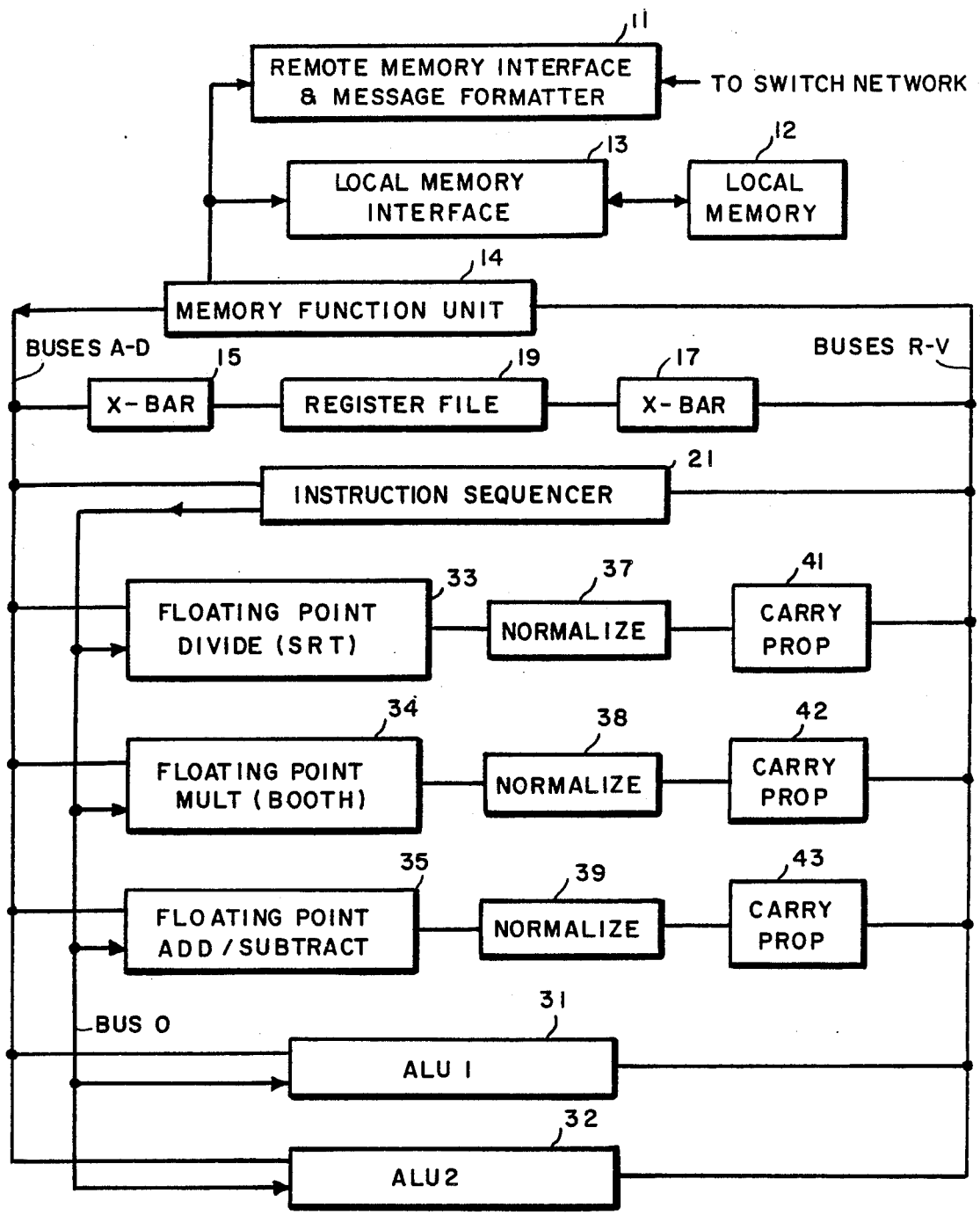
FIG. 1 is a block diagram illustrating a microprocessor architecture incorporating floating point add/subtract apparatus constructed in accordance with the present invention.

FIG. 1 illustrates the overall arrangement of a microprocessor which utilizes serial arithmetic and which is suited for incorporation in a multiprocessor architecture of the type described in copending application Ser. No. 277,993. A remote memory interface and message formatter unit is designated generally by reference character 11. As indicated previously, this unit serves to format bit serial message memory request messages which are coupled into the switch network and to transfer reply messages received from the memory back to the interior of the processor. In addition to having access to the remote shared memory, the processor is typically provided also with some local memory, as designated by reference character 12. This memory is addressed through a local memory interface 13. This local memory is useful principally as an instruction cache. Accesses to both types of memory are controlled through a memory function unit 14 which performs cache management function and may also incorporate address translation functions, e.g. converting virtual addresses to physical addresses.

The memory function unit 14 and the various other units of the processor are linked by a plurality of source buses, designated BUS A through BUS D, and a plurality of destination buses, designated BUS R through BUS V. In the implementation described herein, the source and destination buses are all assumed to be 2-bit wide data paths. The source and destination buses are linked through respective crossbar switches 15 and 17 to a register file 19 which serves to hold arguments, intermediate results and like data.

Instructions obtained either from memory (or from the register file) are decoded by an instruction sequencer 21 and used to generate an appropriate sequence of control signals which are applied to the various computational units through an opcode bus, designated bus 0.

In that serial arithmetic processing units require less chip area than comparable parallel units, it is appropriate to provide a plurality of arithmetic units each tailored to a particular type of operation. This may be contrasted with the arrangement typically employed in the usual parallel processor architecture which utilize a single arithmetic and logic unit having relatively complex control logic so as to enable it to perform many different arithmetic and logical functions. The architecture illustrated in FIG. 1 employs two arithmetic and logic units 31 and 32 for performing relatively simple integer arithmetic and bit logic operations, e.g. such as ANDing and ORing.

Three different units are provided for performing floating point operations, a DIVIDE unit 33, a MULTIPLY unit 34 and an ADD/SUBTRACT unit 35. In accordance with one aspect of the present invention, all three of these units process arguments most significant bits first and generate un-normalized carry save form results. Each of these arithmetic units is followed by a respective normalizer unit, designated by reference characters 37–39, and these normalizer units are followed by units, designated respectively by reference characters 41–43, which perform carry propagation to convert the carry save form results to more normal canonical form for application to a destination bus.

The DIVIDE unit 33 may, for example, implement the so-called SRT algorithm while the MULTIPLY unit 34 may, for example, execute the so-called Booth algorithm. As is understood by those skilled in the art, each of those algorithms produce results most significant bits first. Conventionally, addition and subtraction operations are implemented least significant bits first, whether performed in parallel or serially. Further, in implementing floating point addition and subtraction, it is conventional to utilize a barrel shifter to implement the aligning of bits of correspondingly equal effect in the result. The apparatus of the present invention, however, implements floating point addition and subtraction most significant bits first. Further, by utilizing an examination or comparison of the arguments as they are serially presented to the unit, together with a decrementing counter, the processing unit of the present invention avoids the need for a barrel shifter with its attendant costs and delays. Further, the ADD/SUBTRACT unit of the present invention generates results in an un-normalized carry save form which can be easily normalized and converted to canonical form in a manner entirely consistent with that employed in connection with the DIVIDE and MULTIPLY units 33 and 34 so that a quite regular and repeated architecture can be utilized in providing an integrated circuit implementation of the overall processor.

In keeping with standards promulgated by the IEEE, the floating point processing units 33–35 are arranged to accept arguments in a sign and magnitude format with the magnitude represented by an exponent and a mantissa. Further in accordance with the IEEE standard, there is an implied leading ONE in the mantissa when the exponent is not equal to zero. As is understood by those skilled in the art, a zero exponent indicates a de-normalized number or zero itself, i.e. a special rather than general case.

Figure 2:
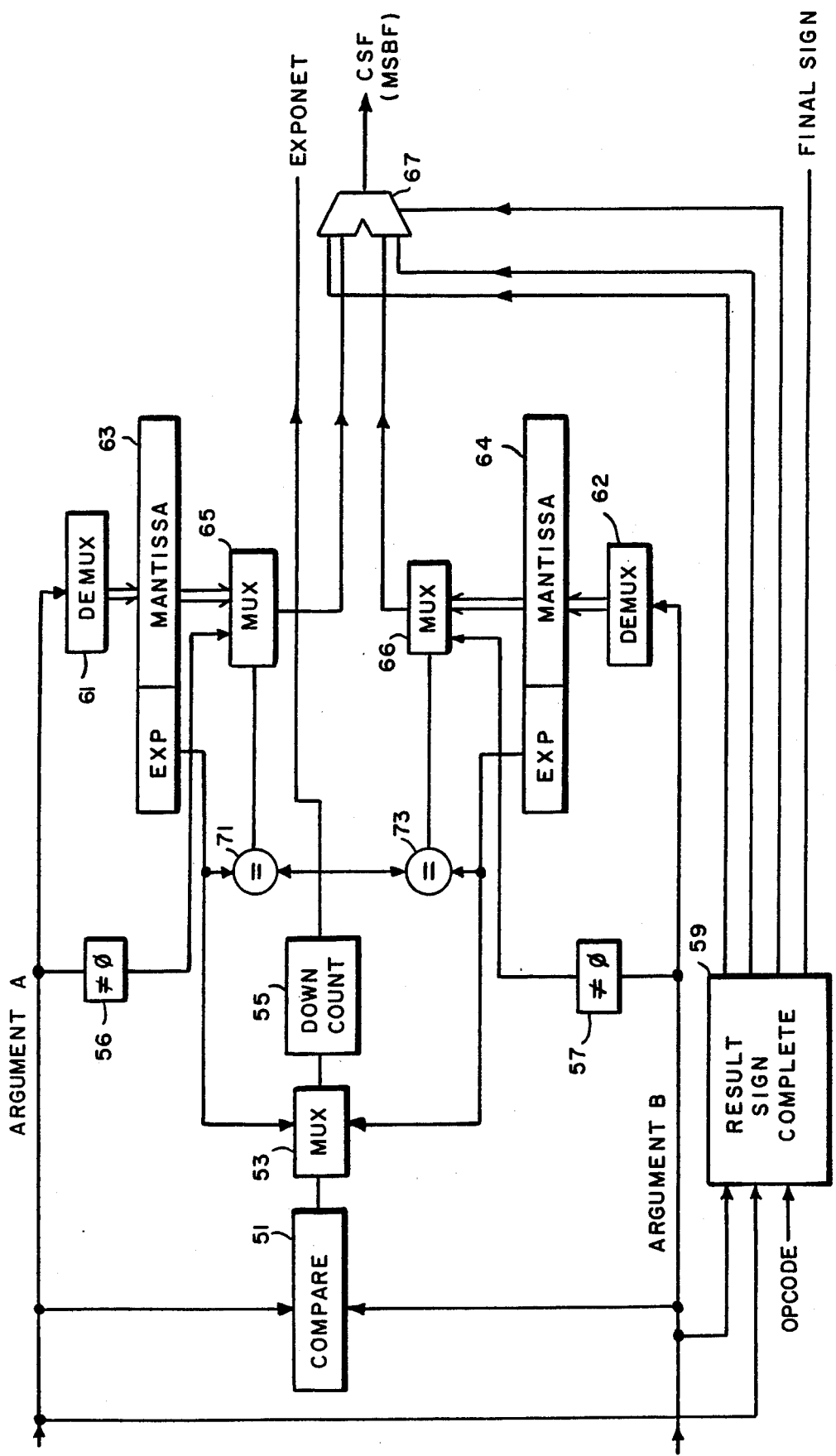
FIG. 2 is a block diagram illustrating the construction of floating point add/subtract apparatus according to the present invention.

FIG. 2 illustrates the arrangement of the floating point ADD/SUBTRACT unit 35 of the present invention. As indicated previously, the source buses are 2-bit wide and provide arguments to the various arithmetic units least significant bits first on a 2-bit wide data path. In FIG. 2, the two arguments are designated as Argument A and Argument B. As they arrive, both arguments are provided to a comparator circuit 51 which operates to determine which of the two arguments is the larger. As is described in greater detail hereinafter, the result of this comparison is used to control a multiplexer or selector 53 which selects one or the other of the exponents for loading into a down counter 55. The exponents of the arguments are also examined by a respective pair of comparators 56 and 57 which merely determine if the respective exponent is equal to zero. If the exponent is not equal to zero, a signal is generated which signifies that a leading ONE is to be implied to the respective mantissa.

The arriving arguments are also provided to respective de-multiplexers 61 and 62 which load the arguments, mantissa and exponent into respective registers 63 and 64. The sign bits of the originally arriving arguments, however, are not loaded into the respective registers but, rather, re-calculated sign bits are derived as described hereinafter.

While the arguments arrive least significant bit first, they are, in accordance with another aspect of the invention, processed most significant bits first. Multiplexers, designated by reference characters 65 and 66 are provided for extracting data out of the registers 63 and 64, respectively, on the basis of most significant bits first for application to an arithmetic circuit 67 which can perform addition or subtraction on respective portions of the arguments presented thereto and generate corresponding carry save form results portions. As is understood by those skilled in the art, if the argument portions presented are 2-bits wide, the carry save form result portion will be 3-bits wide, i.e. 2-bits of SUM data and a carry bit. While the use of 2-bit wide data paths is presently preferred in that it provides a useful balance of speed and complexity well matched to the bit serial memory reference scheme described in copending application Ser. No. 277,993, it should be understood that a 4-bit wide data path might also be utilized within the processor while maintaining the basically serial nature of arithmetic operations. In the case of 4-bit wide data paths, the carry save form result portions would then be 5-bit wide, four bits of sum data and a carry bit.

Largely for reasons of reduced power consumption, it is presently preferred that the registers 63 and 64 be implemented as static registers with multiplexers and demultiplexers being provided by introducing and extracting data in the respectively desired serial fashion. As will be appreciated by those skilled in the art, however, the operations are essentially like shifting in nature and thus the registers 63 and 64 might also be implemented as dynamic shift registers, the direction of shifting being reversed between entry and extraction.

Since it is the purpose of the unit 35 to perform floating point addition and subtraction, it will be understood that it will not normally be the case that corresponding bits of the two mantissas will be combined but, rather, there will need to be an offsetting between the two mantissas prior to their application to the arithmetic circuit 65. As indicated previously, this offsetting function is most usually provided by a barrel shifter. In the apparatus of the present invention, however, this offsetting is provided by delaying the application of one of the mantissas, based on the relative sizes of their exponents.

The two exponents, e.g. as held in corresponding portions of the registers 63 and 64, are applied to the multiplexer of selector 53 described previously and the multiplexer, acting under the control of the examining or comparator circuitry 51, causes the larger exponent to be initially loaded into a down counter 55. A pair of comparators, designated by reference characters 71 and 73, are provided for comparing the respective exponent values with the then current value held in the down counter. The comparators 71 and 73 control the respective multiplexers 65 and 66 so as to initiate transferring of the respective mantissa to the arithmetic circuit 67 when the current value in the down counter corresponds to the corresponding exponent value. At this point, it should be understood that correspondence in this sense may or may not be actual equality since some offset may be required due to mismatch and delays through the serial handling of data within the system. This offset, if needed, may be implemented either at the comparators 71 and 73 or in loading the original value into the down counter 55 in correspondence with the larger of the exponents rather than in exact equality thereto.

For each mantissa the first or most significant bit selected by the multiplexer 65 or 66 is the implied one if a non-zero exponent is detected by the respective comparator circuits 56 or 57 as described previously.

As is understood by those skilled in the art, the detailed implementation of the arithmetic circuit 67 is facilitated if subtraction is always performed so that the smaller mantissa is subtracted from the larger. This can be done if the incoming arguments are examined as they arrived and the signs of the arguments are adjusted with the final sign of the result being determined independently of the arithmetic circuit. This function is provided by a control logic array 59 which examines the incoming arguments and operates as follows.

The control logic 59 first determines if the operation will result in the difference or the sum of the operands. This takes place in two steps. In the first step, the operation code is examined and the signs of the operands are adjusted if necessary (Sign of A is complemented if operation is B-A. Sign of B is complemented if operation is A-B). The results of these adjustments are then compared and if they are different then a difference will be computed, otherwise a sum will be computed.

If a sum is to be computed, the ALU Control Logic does not negate either of the operands entering the ALU. If a difference is computed, the ALU Control Logic examines the relative magnitudes of the operands and negates the smaller of the two. Thus, the difference is guaranteed to be positive in twos complement form and is therefore the magnitude of the result.

A trivial approach to determining the sign of the result is to simply say that the sign of the result is always the sign of the larger operand. If there is no larger then the sign is ambiguous and either sign would do. However, the IEEE standard goes several steps further with the algorithm shown below being the result and this is the algorithm preferably implemented by the control logic 59.

```
if (A > B)
    Result _Sign = Sign _of _A;
else if (A < B)
    Result _Sign = Sign _of _B;
else if (computing sum)
    Result _Sign = Sign _of _A;
else if (rounding toward negative infinity)
    Result Sign = Negative;
else
    Result Sign = Positive;
```

Figure 3:
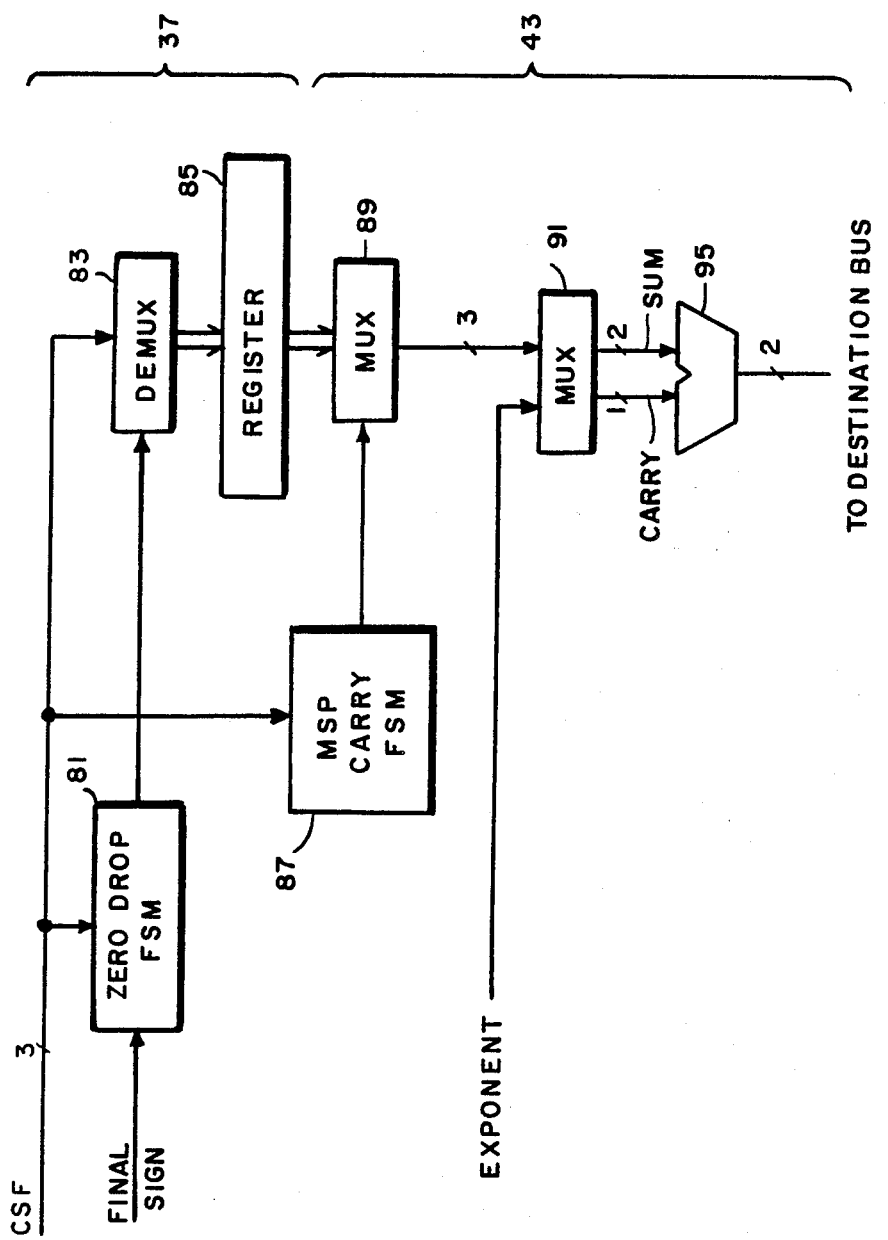
FIG. 3 is a block diagram of normalizing and carry propagating circuitry used in conjunction with the add-/subtract apparatus of FIG. 2.

As will be understood by those skilled in the art, the circuitry of FIG. 2 will generate result portions in denormalized carry save form, that is, the results may include leading zeros. The circuitry of FIG. 3 provides for normalizing the result and changing from a most significant bits first format to a least significant bits first format. The carry save form results obtained from the circuit of FIG. 2 are applied both to a finite state machine, designated by reference character 81, which effects zero dropping and to a de-multiplexer circuit 83 which save form result portions into a register 85. The start of the loading by de-multiplexer 83, however, is controlled by the finite state machine 83 according to the following logic so that initial zeros are not loaded as mantissa into the register thereby to effect normalization of the carry save form results. For results which are the sum of two mantissas as in the case of the add/subtract unit 35, the FSM is rather simple. It examines each digit of the carry save form and discards any digit which has a zero sum and a zero carry. The following state logic shows the FSM behavior:

```
2) wait for-nonzero...
        if (carry IS 0 AND sum IS 0) goto2;
        else goto 1;
1) got __nonzero __digit:
        record answer.
```

The incoming carry save form result portions are also examined by a second finite state machine, designated by reference character 87, which operates to determine whether there is a possible most significant bit carry upon conversion from carry save form to normal or canonical form. The finite state machine 87 operates in accordance with the following logic. In twos complement arithmetic, the computation of a difference which is known to be positive must result in a carry out of the most significant digit. As a result, the normalization logic can detect the redundant form simply by noticing that the leading "0/f" forms will translate to 0 when the carry is propagated from some lower position. The state logic is as follows.

```
3) if (carry IS 0 AND sum IS all __ones) goto 3.
        else if (sum IS 0) goto 1.
        else goto 2.
2) wait __for __nonzero...
        if (carry IS 0 AND sum IS 0) goto 2.
        else goto 1;
1) got __nonzero __digit:
        record answer,
        goto 1;
```

To convert from most significant bits first format to least significant bits format, the mantissa data is taken out of the register 85 by a multiplexer 89. The starting position within the register, however, may be altered under the control of the finite state machine 87 to provide a place for most significant bit carry according to the finite state machine logic described above. As suggested previously with reference to FIG. 2, a reversible shift register might, in some implementations, be used in place of the static register 85 and its associated multiplexer and de-multiplexer.

The mantissa information, still in carry save form but normalized, is combined with the exponent information in a further multiplexer or selector 91. A adder 95 is provided for adding the carry bits to the respective carry save form partial sums since, now that the data is being presented least significant bits first, the carrys can be propagated to the more significant bits thus converting the carry save format to normal or canonical form. If rounding is to be implemented, it can also be implemented at this stage.

Summarizing, it can be seen that the architecture of the present processing unit provides for the floating point addition or subtraction of a pair of arguments without requiring the inclusion of a barrel shifter. The method employed utilizes the examination of arguments presented serially to determine which is the larger with the exponent of the larger being loaded into a counter which controls the delaying of one mantissa with respect to the other in the combining of the mantissas in an arithmetic circuit, the mantissas being combined most significant bits first.

With minor additions, the circuitry illustrated in FIGS. 2 and 3 can also perform the FIX and FLOAT instructions which are typically also included in the instruction sets of computers performing floating point operations. In the FIX operation, a constant is loaded into the down counter 55 through the multiplexer 53 and the value in the down counter is compared, e.g. in the comparator 71, with the exponent of the single argument, assumed to be Argument A. The effective exponent of Argument B is forced to be "zero" for both the FIX and FLOAT operations. As in addition and subtraction, the comparator 71 controls the operation of the multiplexer 65 in the reading out of the mantissa from register 63 but no exponent is delivered.

In implementing a FLOAT operation, the equal signal normally derived from the comparator 71 is initially forced so that the delivery of the mantissa starts immediately. As distinct from the FIX operation, however, the FLOAT operation utilizes the value read out of the down counter 55 to form the exponent in the result being outputted.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for performing floating point addition or subtraction on a pair of binary arguments, each of which includes an exponent portion and a mantissa portion, said apparatus comprising:
   means for examining said arguments thereby to determine which argument is the larger;
   counter means;
   means for loading a value corresponding to the exponent portion of the larger argument into said counter;
   arithmetic circuit means for generating carry save form result exponent and mantissa portions from corresponding portions of a pair of arguments presented to said arithmetic circuit means;
   respective means for selectively transferring at least parts of each of the mantissas into said arithmetic circuit means, most significant bits being transferred first;
   means for comparing each of the exponents with the current value held by said counter;
   control means for stepping said counter and for controlling said respective transferring means in response to said comparing means to initiate transferring of each mantissa when the value held by said counter corresponds to the respective exponent.

2. Apparatus for performing floating point addition or subtraction on a pair of binary arguments which are presented serially, each of said arguments including an exponent portion and a mantissa portion, said apparatus comprising:
   means for examining corresponding portions of said arguments sequentially as said arguments are presented thereby to determine which argument is the larger;
   counter means;

means for loading a value corresponding to the exponent portion of the larger argument into said counter;

arithmetic circuit means for generating carry save form result exponent and mantissa portions from corresponding portions of a pair of arguments presented to said arithmetic circuit means;

respective means for selectively transferring at least parts of each of the mantissas into said arithmetic circuit means, most significant bits being transferred first;

means for comparing each of the exponents with the current value held by said counter;

control means for stepwise decrementing said counter and for controlling said respective transferring means in response to said comparing means to initiate shifting of each mantissa when the value held by said counter corresponds to the respective exponent.

3. Apparatus as set forth in claim 2 further comprising means for dropping leading zeros from the output of said arithmetic circuit means.

4. Apparatus as set forth in claim 3 further comprising means for generating a result exponent based upon the value held in said counter when the first non-zero result is generated by said arithmetic circuit means.

5. Apparatus as set forth in claim 2 further comprising means for outputting said carry save form results serially least significant digits first and simultaneously converting said carry save form results to canonical form.

6. Apparatus for performing floating point addition or subtraction on a pair of binary arguments which are presented serially, each of said arguments including an exponent portion and a mantissa portion, said apparatus comprising:

means for examining corresponding portions of said arguments sequentially as said arguments are presented thereby to determine which argument is the larger;

counter means;

means for loading a value corresponding to the exponent portion of the larger argument into said counter;

arithmetic circuit means for generating carry save form result exponent and mantissa portions from corresponding portions of a pair of arguments presented to said arithmetic circuit means;

respective means for selectively transferring at least parts of each of the mantissas into said arithmetic circuit means, most significant bits being transferred first;

means for comparing each of the exponents with the current value held by said counter;

control means for stepwise decrementing said counter and for controlling said respective transferring means in response to said comparing means to initiate shifting of each mantissa when the value held by said counter corresponds to the respective exponent;

means for dropping leading zeros from the output of said arithmetic circuit means;

means for generating a result exponent based upon the value held in said counter when the first non-zero result is generated by said arithmetic circuit means; and means for outputting said carry save form results serially least significant digits first and simultaneously converting said carry save form rsults to canonical form.

* * * * *

UNITED STATES PATENT AND TRADEMARK OFFICE
CERTIFICATE OF CORRECTION

PATENT NO. : 4,943,941

DATED : July 24, 1990

INVENTOR(S) : Edward S. Harriman, Jr.

It is certified that error appears in the above-identified patent and that said Letters Patent is hereby corrected as shown below:

Column 6, at the beginning of line 63, after "which" insert --can load the carry--.

Signed and Sealed this

Seventeenth Day of September, 1991

Attest:

HARRY F. MANBECK, JR.

*Attesting Officer*  *Commissioner of Patents and Trademarks*